July 15, 1969 W. E. DUNN ET AL 3,455,176
DRIVE SYSTEM FOR ROTATING EQUIPMENT
Filed Sept. 15, 1966 7 Sheets-Sheet 4

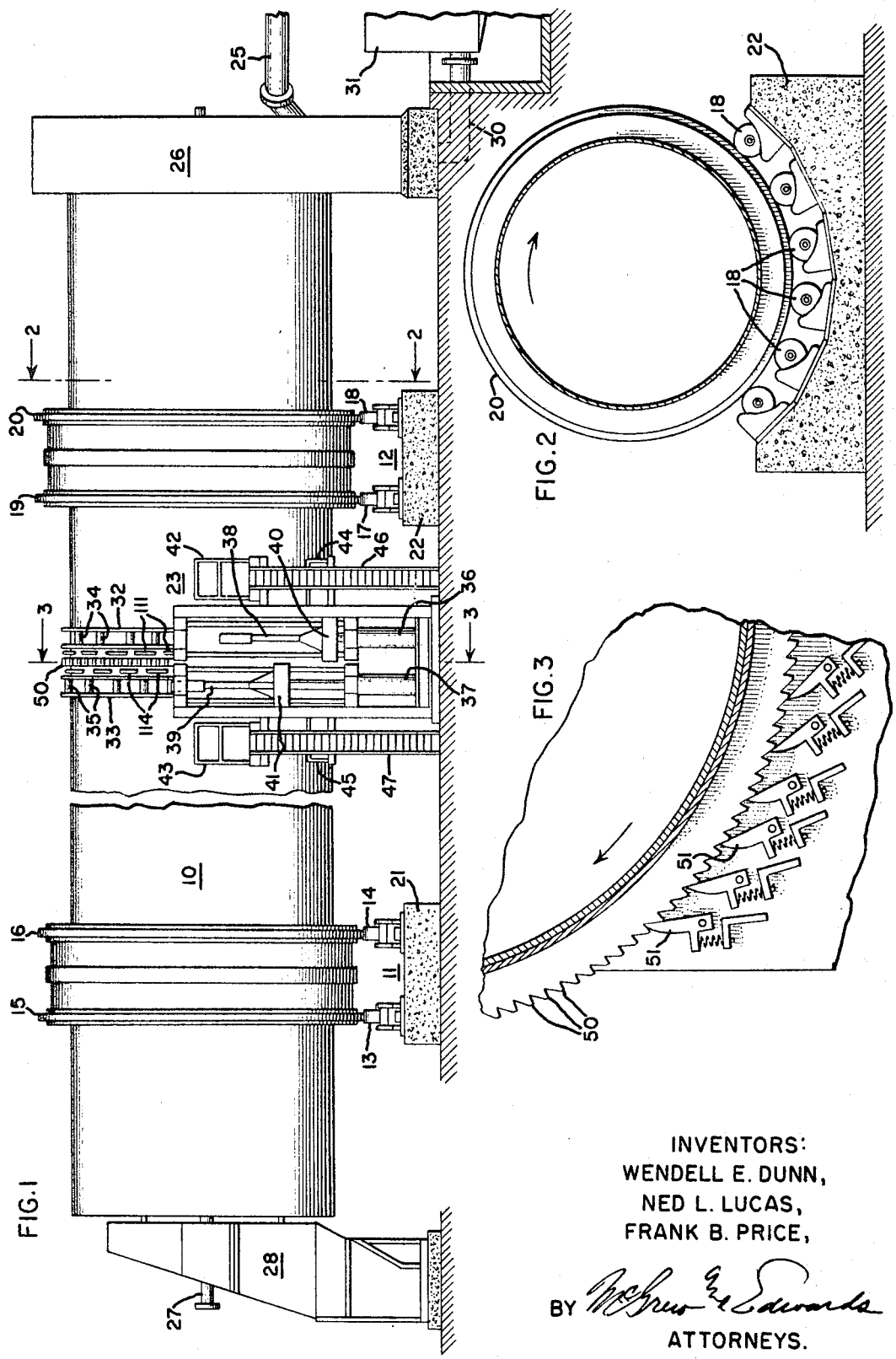
July 15, 1969 — W. E. DUNN ET AL — 3,455,176
DRIVE SYSTEM FOR ROTATING EQUIPMENT
Filed Sept. 15, 1966 — 7 Sheets-Sheet 1
INVENTORS:
WENDELL E. DUNN,
NED L. LUCAS,
FRANK B. PRICE,
ATTORNEYS.

INVENTORS:
WENDELL E. DUNN,
NED L. LUCAS,
FRANK B. PRICE,

BY *McGrew & Edwards*
ATTORNEYS.

July 15, 1969  W. E. DUNN ET AL  3,455,176
DRIVE SYSTEM FOR ROTATING EQUIPMENT
Filed Sept. 15, 1966  7 Sheets-Sheet 5
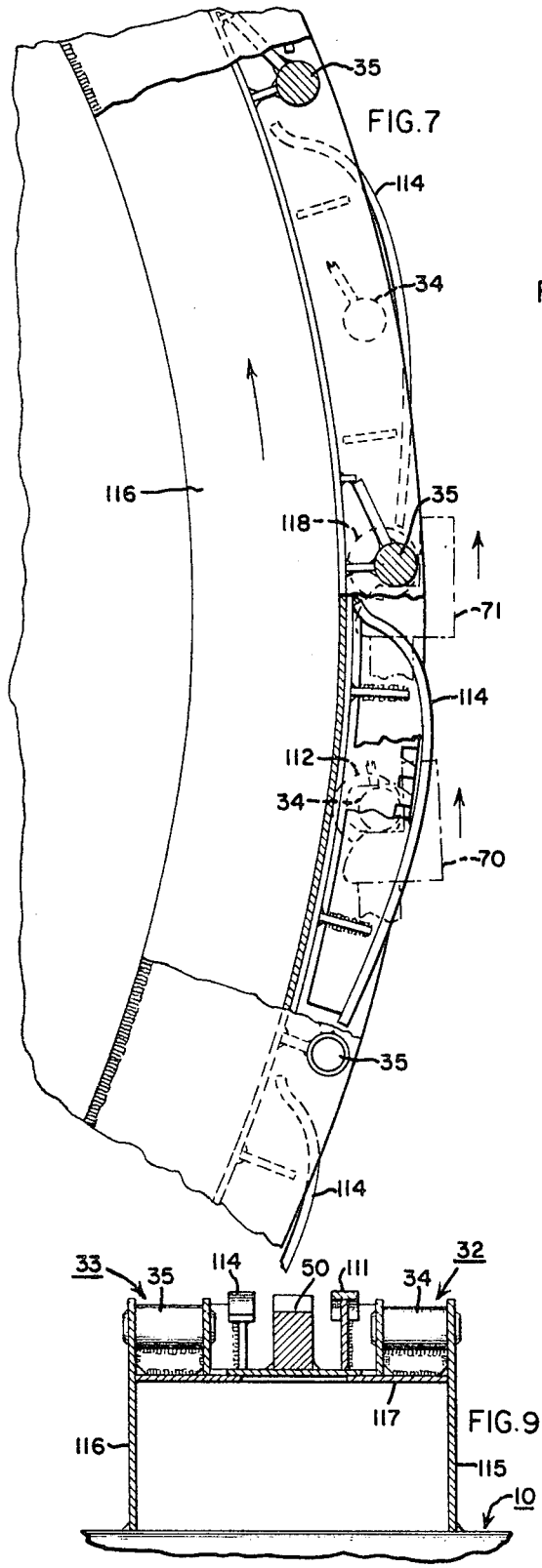
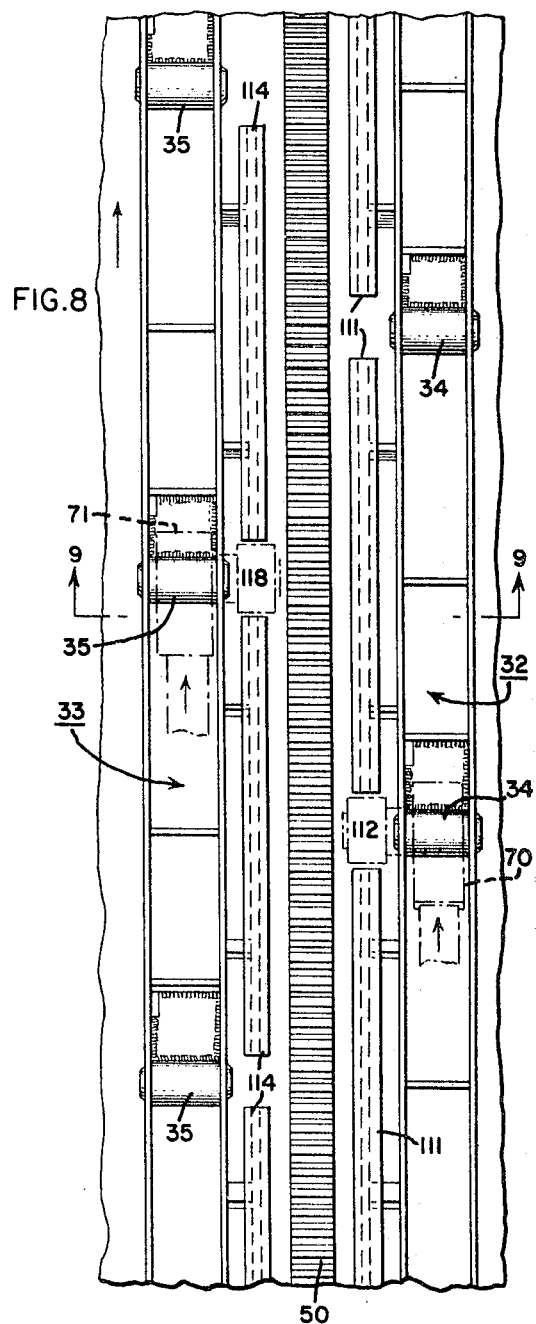
INVENTORS:
WENDELL E. DUNN,
NED L. LUCAS,
FRANK B. PRICE,
BY *McGrew & Edwards*
ATTORNEYS.

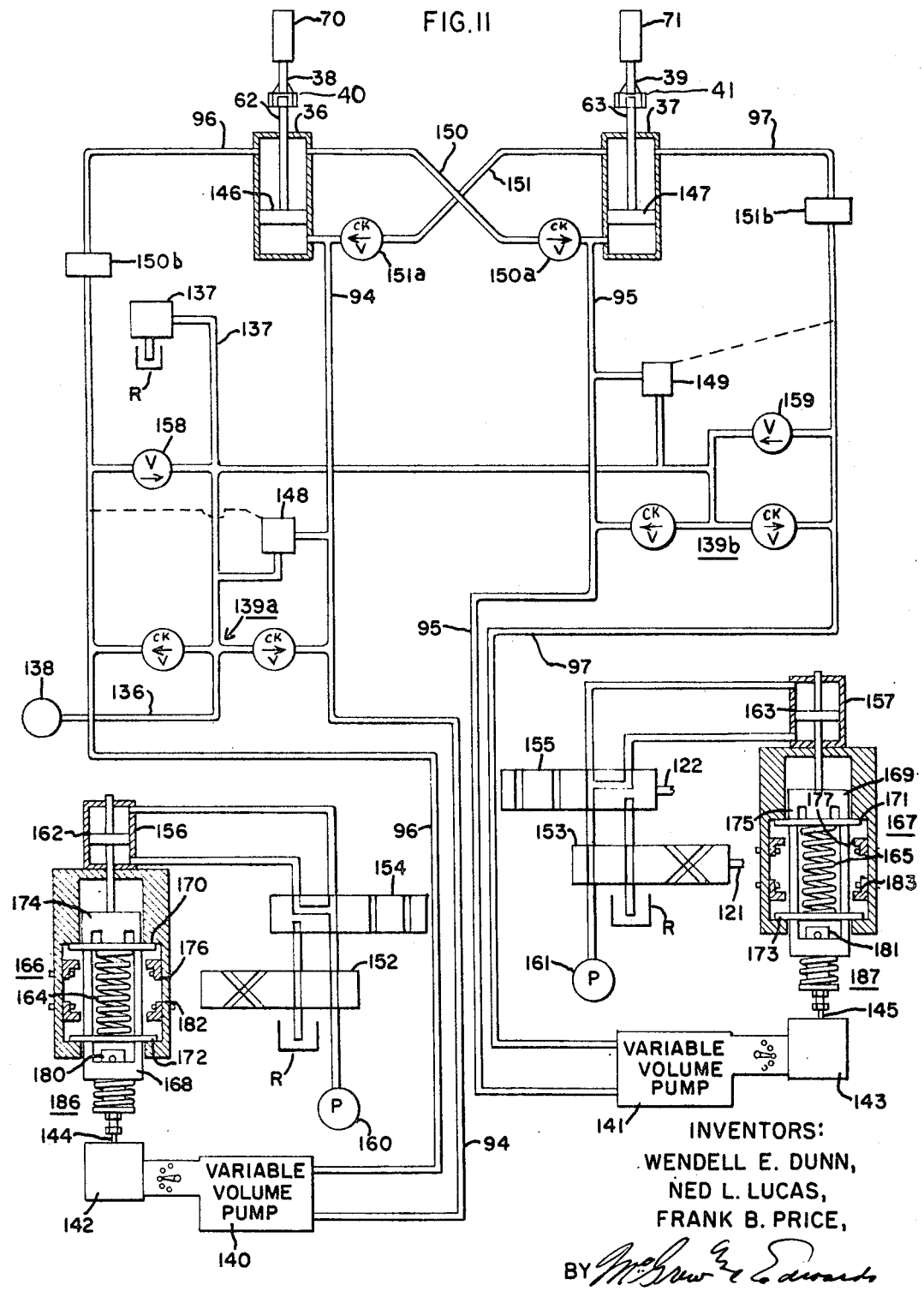

United States Patent Office 3,455,176
Patented July 15, 1969

3,455,176
DRIVE SYSTEM FOR ROTATING EQUIPMENT
Wendell E. Dunn, Adams County, Ned L. Lucas, Wheatridge, and Frank B. Price, Edgewater, Colo., assignors to American Factors Associates, Limited, Honolulu, Hawaii, a corporation of Delaware
Filed Sept. 15, 1966, Ser. No. 579,602
Int. Cl. F16h 27/02
U.S. Cl. 74—129               13 Claims

ABSTRACT OF THE DISCLOSURE

A hydraulic drive system for heavy rotating equipment particularly such equipment having heavy eccentric loading, comprises a pair of hydraulically driven thrust bars which engage equally spaced lugs arranged about the periphery of the rotating drum. Engagement of the driving mechanism and lugs is controlled so that each successive engagement of a drive lug occurs before the termination of the engagement of the preceding lug and the operating mechanism and uninterrupted smooth continuous drive is attained. In order further to facilitate the operation of picking up the drive by the succeeding thrust bar an arrangement is provided for accelerating the forward movement of the succeeding bar so that it engages the respective lug taking up all slack before driving thrust and shock can occur.

---

This invention relates to heavy material processing equipment of the rotating drum type and particularly to an improved drive system suited for very large size rotating apparatus such as sugar beet diffusers wherein heavy eccentric loads may be present.

In rotating drum type material treating equipment designed for the treatment of loose or fluid material the normal rotating operation of the drum results in an eccentric disposition of the load about the longitudinal axis. For economic operation some processing treatments make it desirable to provide single drum units of very large capacity and the effective handling of the resulting large eccentric load gives rise to difficult problems in the design of the equipment. Various forms of driving mechanism have been employed for this purpose; however, difficulties have been encountered particularly in applications for extremely heavy loads and under continuous operation. For example, in the beet sugar industry it is necessary to process great quantities of beets promptly in a relatively short harvesting season or "campaign." The beets are cut or chopped into small pieces or cossettes and these are treated in a suitable leaching liquid to remove their sugar content. Rotary diffusers comprising cylindrical drums have been found effective for this purpose. These diffusers may be of the order of twenty feet in diameter and one hundred feet in length and when loaded may weigh as much as two and one-half million pounds. The drums are rotated at low speeds which may for example, lie within a range of one to twenty revolutions per hour; nevertheless, the rotation of the mass to be treated results in an eccentric disposition of the load and difficulties are encountered in operating the drum at steady uniform rates. Alternately operated pusher bars have been employed heretofore to drive a drum diffuser, the power being interrupted on transfer from one bar to the other and the diffuser operating at a speed of the order of one revolution per hour; the present invention relates to an improved system for operation at substantially higher speeds in the above range and which is particularly effective to provide smooth and continuous rotation. Accordingly it is an object of the present invention to provide a drive system for heavy rotating equipment which is simple and effective in operation and capable of operating continuously for prolonged periods of time.

It is another object of this invention to provide an improved low speed drive for heavy rotating drum type equipment.

It is another object of this invention to provide a continuous drive for heavy rotating drum equipment including an improved arrangement for preventing reverse rotation of the equipment due to the eccentric loading of the drum should the drive be disconnected.

It is a further object of this invention to provide an improved drive system for heavy rotating drum type material treating apparatus which effects uniform low speed continuous rotation of the drum.

Briefly, in carrying out the objects of this invention in one embodiment thereof, a beet sugar diffuser of the drum type is constructed and installed for rotation about a substantially horizontal axis. The diffuser may be designed to handle a load of the order of two million pounds of leaching liquor and cossettes to be treated. A drive system embodying the invention is employed to rotate the drum at selected speeds of, say, between one and twenty revolutions per hour. The drive system includes a pair of hydraulically powered pusher bars arranged and controlled to engage the drum alternately and individually, each pusher bar being controlled to begin its power stroke before the end of the power stroke of the other bar. A safety pawl and ratchet arrangement is provided to prevent reverse rotation of the drum upon release of the drive when the drum is loaded eccentrically due to normal operation. It has been found that smooth continuous rotation is effected by the operation of the system and its controls.

The features of novelty which characterize this invention are pointed out with particularity in the claims annexed to and forming a part of this specification. The invention itself, however, both as to its organization and its method of operation together with further objects and advantages thereof, may best be understood by reference to the following description taken in connection with the accompanying drawings in which:

FIG. 1 is a front elevation view of a drum type diffuser provided with a drive system embodying the invention;

FIG. 2 is a sectional elevation view of the diffuser taken along the line 2—2 of FIG. 1 with interior details omitted;

FIG. 3 is a sectional view taken along the line 3—3 of FIG. 1;

FIG. 7 is an enlarged elevation view with a portion broken away and in section illustrating the details of the drive engagement assembly;

FIG. 8 is a front elevation view of the portion of the drive assembly shown in FIG. 7;

FIG. 9 is a sectional view along the line 9—9 of FIG. 8;

FIG. 11 is a schematic diagram of the control and hydraulic drive system for the drive mechanism of the invention.

Figure 4:
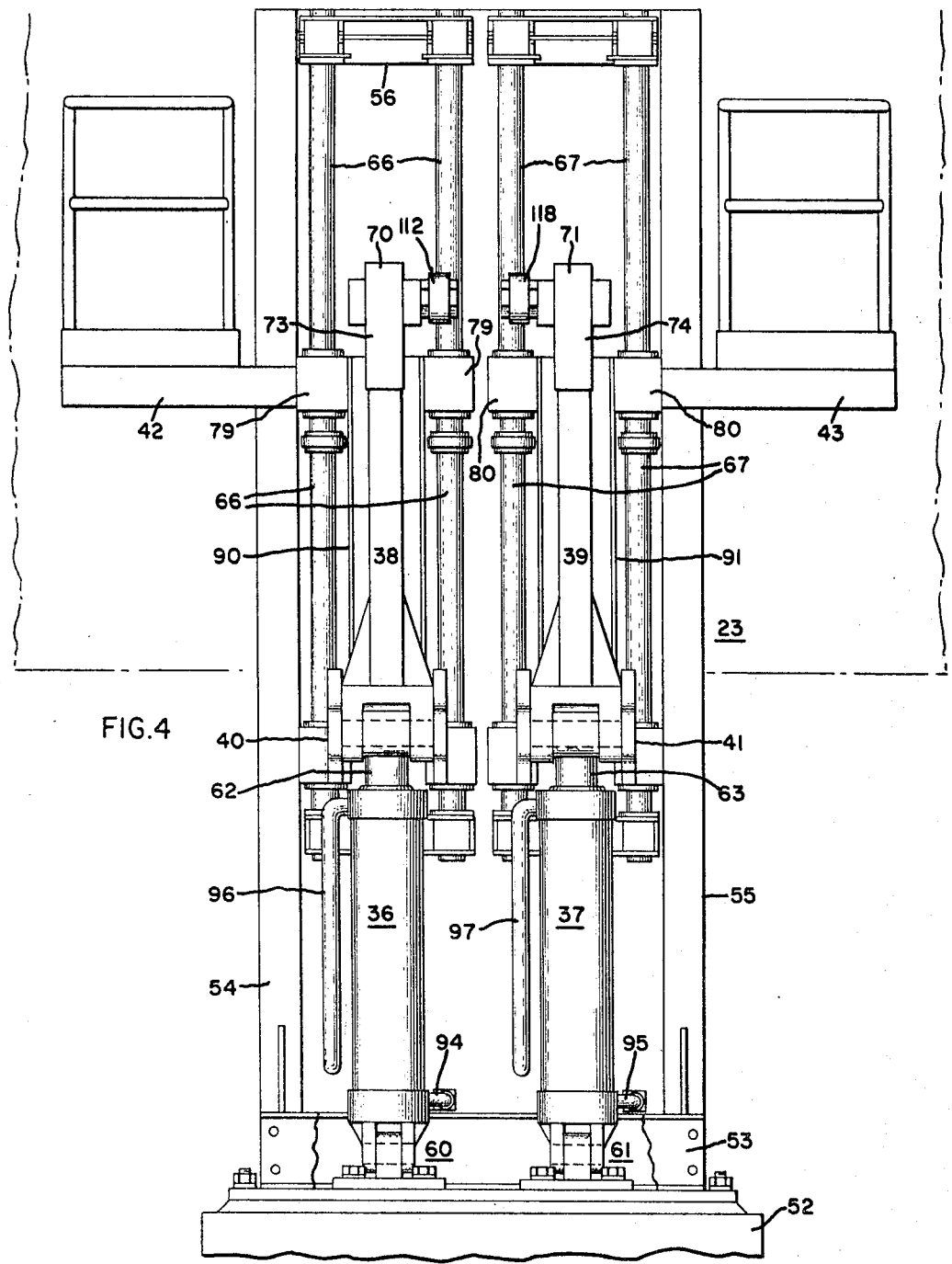
FIG. 4 is an enlarged view of the drive illustrated in FIG. 1.

Referring now to the drawings, the beet sugar diffuser illustrated in FIGS. 1 and 2 comprises a main cylinder or drum 10 mounted for rotation on a horizontal axis on trunnion assemblies 11 and 12 which include rollers 13 and 14 in the assembly 11 for engaging circular tracks or rails 15 and 16, respectively, mounted on the drum 10 and similar rollers 17 and 18 of the assembly 12 arranged in engagement with the rails 19 and 20. The mountings 11 and 12 are secured on reinforced concrete cradles or bases 12 and 22, respectively, shaped as indicated in FIG. 2, there being six of the roller assemblies 17 and 18, the rollers 18 appearing in FIG. 2. These rollers are preferably adjustable individually so that they may be maintained in substantially uniform constant force engagement with their respective tracks, illustrated by the track 20 in FIG. 2, in order to compensate for any variations of the tracks from a true circle. For this purpose the rollers may be maintained in engagement by hydraulic pressure.

The drum 10 is rotated by a drive assembly 23 located between the supporting assemblies 11 and 12. Fresh cossettes to be treated are charged into the diffuser through a supply pipe 25 at the right end as shown in FIG. 1 and enter an end assembly 26 wherein they are delivered to the interior of the drum. Fresh water is supplied to the interior of the drum through a pipe 27 in a left end water supply and cossette discharge assembly 28 and the spent cossettes are discharged through this assembly to a suitable conveyor belt or other discharge apparatus (not shown).

The rich liquor is discharged from the drum through the end assembly 26 by a pipe 30 and enters a juice tank 31 from which it is delivered for further treatment. A knowledge of the details of construction of the charge and discharge assemblies is not essential to an understanding of the present invention and these details have therefore been omitted.

The drive assembly 23 operates to drive the drum 10 through circumferentially mounted pin assemblies 32 and 33 having sets of drive pins 34 and 35, respectively, comprising equally spaced pins, the pins in the two assemblies being arranged in staggered relationship with respect to one another as shown. Two hydraulic drive cylinders 36 and 37 are mounted below the drum at one side thereof and arranged to drive pusher bars 38 and 39, respectively, to which they are connected by crossheads 40 and 41, respectively. For purposes of inspection and servicing, upper platforms 42 and 43 and lower platforms 44 and 45 are provided, all of which may be reached through stairways 46 and 47.

The operation of the pusher bars 38 and 39 is controlled so that the bars are operated alternately, one engaging a pin and driving the drum to a position near the upper part of the stroke of the bar and the other engaging a pin on its respective assembly before completion of the stroke of the first bar, this operation being continuous and providing uniform drive of the drum at all times. The manner in which this drive is effected is described in detail below.

In FIG. 3 there is illustrated a rack and pawl assembly comprising a toother rack 50 and a series of six pawls 51 positioned to prevent reverse rotation of the drum, the direction of rotation of the drum being indicated by arrows in FIGS. 2 and 3. Should the drive for any reason fail, the eccentric load inherent in the operation of the drum will tend to rotate the drum in a reverse direction. The pawls 51 are spaced at uniform distances, the spacing being such that some one of the pawls will be, say, within one inch of one of the teeth on the track 50 regardless of the position of the drum. This may be accomplished, for example, by spacing the pawls uniformly at a distance equal to that of a plurality of the spaces between teeth plus or minus one inch. It will readily be understood that with this rack and pawl assembly the reverse rotation of the drum will be stopped almost immediately upon any failure of the drive so that no substantial build-up of momentum in the reverse direction can be attained by the drum.

Figure 5:
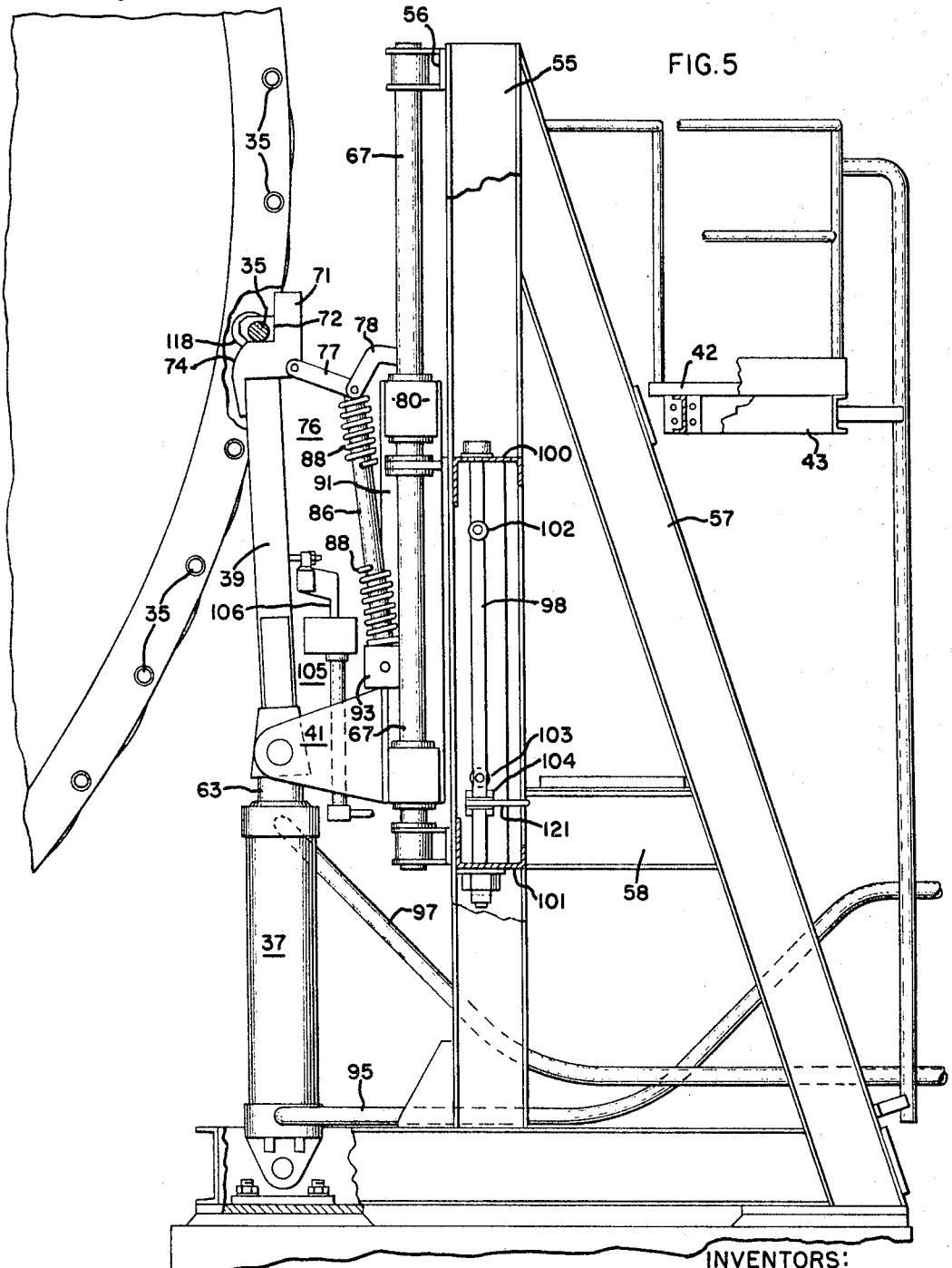
FIG. 5 is a side elevation view of the portion of the drive shown in FIG. 4.

In FIGS. 4 and 5 the drive assembly 23 is illustrated with both pusher bars 38 and 39 in their lowermost positions, this being a non-operating condition which could prevail only during idle periods. The assembly is mounted on a foundation or base 52 and comprises a steel beam base frame 53 and a pair of vertical uprights 54 and 55 connected at their tops by a cross piece 56 and having a pair of inclined braces one for each of the beams 54 and 55 as indicated by the brace 57 for the beam 55 as shown in FIG. 5. A cross brace is provided between the inclined braces on the vertical beams as indicated at 58 in FIG. 5.

The hydraulic cylinders 36 and 37 are pivotally mounted on the base 52 as indicated by pivot assemblies 60 and 61, respectively. The cylinders 36 and 37 are provided with pistons (not shown) arranged to drive piston rods 62 and 63, respectively, and these rods and the pusher bars 38 and 39 are pivotally connected to each other and to crossheads 40 and 41, respectively. The crossheads 40 and 41 are slidably mounted on respective pairs of vertical rods 66 and 67 extending from the level of the crosspiece 58 to the top of the beam 55.

In order to protect the slide rods from foreign matter and atmospheric conditions, they preferably are enclosed in sealed expansible bellows which afford full movement of the crosshead while preventing access of dust or outside air to the rod surfaces. These seals have been omitted for purposes of clarity.

At their upper ends the pusher bars 38 and 39 are provided with heads 70 and 71, respectively, for engagement with the pins of the respective assemblies 32 and 33, the engagement of the head 71 with a drive pin 35 being shown in FIG. 5. The heads 70 and 71 are shaped to provide a right-angled pocket, as indicated at 72 on the head 71 in FIG. 5, and with smooth camming or contact surfaces 73 and 74, respectively, for smooth sliding engagement with the pins during the operation of the drive. The heads 70 and 71 are biased toward the drum by toggle assemblies 75 and 76, the assembly 75 being indicated in FIG. 6. The assembly 76, as indicated in FIG. 5, comprises a first link 77 pivoted on the head 71 and a second link 78 pivoted to a slide or crosshead 80 mounted on the pair of vertical rods 67. The toggle assembly 75 is mounted similarly on the pair of rods 66. The toggle assembly 75 comprises a first link 83 and a second link 84 of the same construction as the links 77 and 78.

The toggle assemblies 75 and 76 include rods 85 and 86, respectively, pivoted at their lower ends on the crossheads 40 and 41 and surrounded by compression springs 87 and 88 which urge the common pivots of the toggle links upwardly and thereby urge the heads 70 and 71 toward the drum. The upper portions of the rods 66 and 67 preferably are protected by bellows-type seals (not shown) in the same manner as the lower portions.

The crossheads 41 and 80 are secured together by a short section of I-beam 91 which extends between the crossheads and holds them rigidly and integrally together as a unitary slide or composite crosshead. The channels of the I-beams face forwardly and rearwardly and the toggle bars 85 and 86 move in and out of their respective channels facing the pusher bars 38 and 39, the lower ends of the toggle bars being slidably mounted in sleeves lying between pairs of lugs 92 and 93 to which they are pivoted, the lugs being welded or otherwise suitably attached to the respective lower crossheads 40 and 41. It will now be seen that the toggle assemblies 75 and 76 provide a continual spring bias urging the bars 38 and 39 toward the diffusion drum at all times.

Hydraulic fluid under pressure for moving the pistons within the cylinders 36 and 37 is supplied through bottom pressure conduits 94 and 95 and through upper pressure conduits 96 and 97, the pistons being moved upwardly when pressure is supplied through the lower conduits and downwardly when it is supplied through the upper conduits. The supply of hydraulic fluid to the cylinders 36 and 37 is controlled by a hydraulic control system including valves (not shown in FIGS. 1 through 6) and the operation of which will be explained in detail in connection with the control diagram, FIG. 11.

The positions of the control valves are effected mechanically by actuation of vertical rock shafts, one for each cylinder, the shaft for controlling the cylinder 37 being shown at 98 in FIG. 5. Both rock shafts are of the same construction. The rock shaft 98, by way of example, is pivotally mounted on cross channels 100 and 101 rigidly attached to the vertical beams 54 and 55 and is provided with an upper cam follower assembly 102 and a lower cam follower assembly 103, each of which includes a roller for engagement with a cam rigidly attached to the crosshead 41. These cams are not shown in FIG. 5; however, it will be understood that one cam is positioned on the far side of the shaft to engage the roller of the assembly 103 when the crosshead 41 moves to its lowermost position, engagement of the cam rotating the shaft 98 from left to right as viewed in FIG. 5 and the other cam being rigidly secured to the crosshead 41 on the near side of the shaft as viewed in FIG. 5 and positioned to engage the cam follower 102 and rotate the shaft 98 by a slight angle in the reverse direction. The rocking of the shaft 98 in this manner is employed to position the forward and reverse control valves through couplings with the valve made through a connection 104 on the rock shaft 98 below the cam follower 103. By rotation of the shaft in this manner it will be understood that the supply of hydraulic fluid to the cylinder 37 is reversed at each end of the stroke.

When the crosshead 41 reaches its lowermost position a dwell valve is moved to its dwell position by a camming operation of a control 105. A finger 106 is secured to the pusher bar 39 and is effective when the pusher bar moves into position against the next pin to be engaged to release the dwell valve and initiate the forward movement of the bar. This control operates in a manner described below to assure the holding of the pusher bar in its lowermost position until its head 71 moves into engagement with the next pin 35. The control assembly for the pusher bar 38 includes the same control elements as those employed with bar 39 and operates in the same manner.

The position of the rocker bar 98 may be observed by an operator standing on one of the platforms 42 and 43. In FIG. 5 the rocker bar 98 is shown in a central or neutral position. The bar 98, however, during operation of the system is either in one extreme position or the other and is held by a two-position cam in the manner described below.

Figure 6:
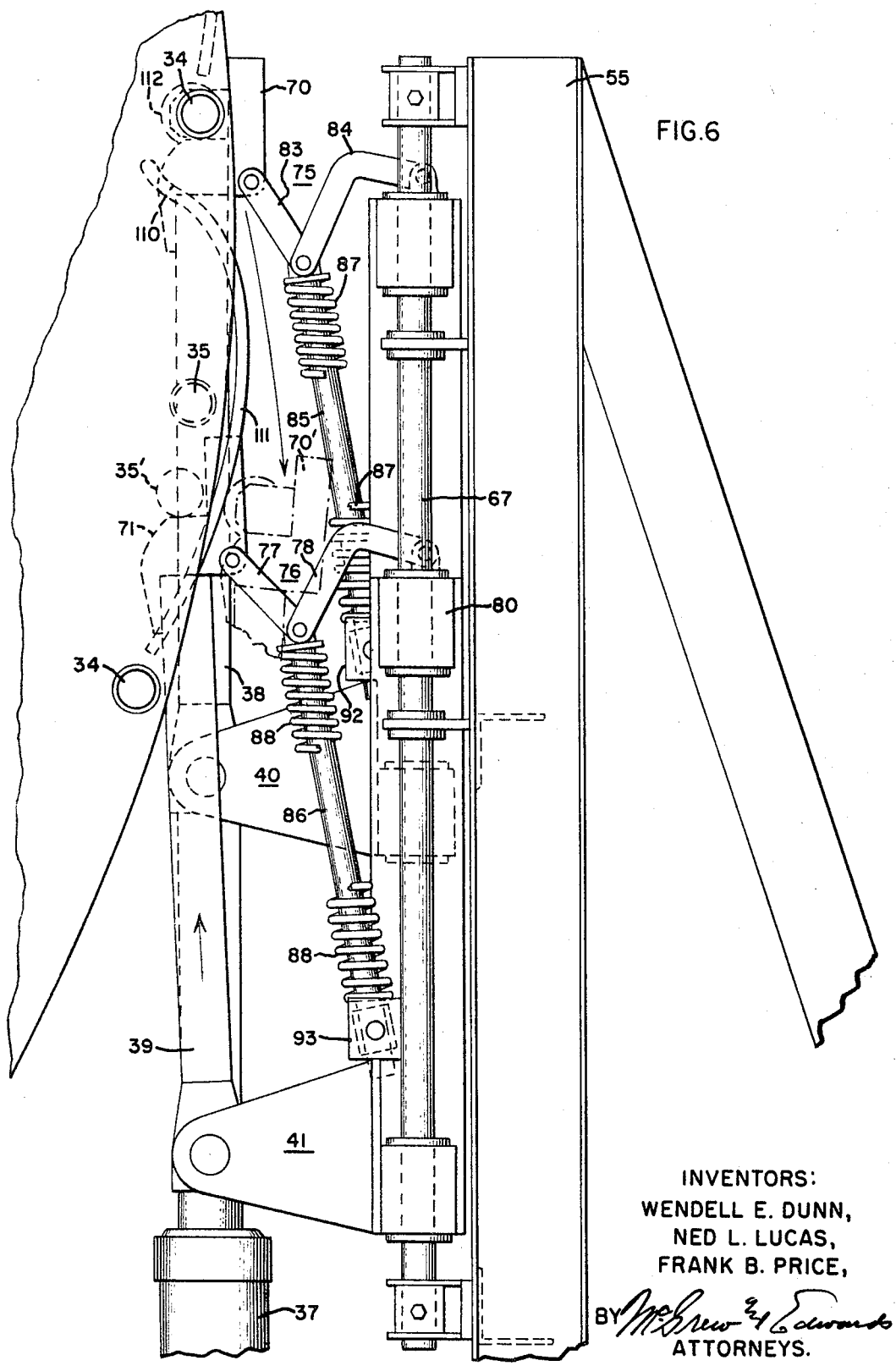
FIG. 6 is an enlarged side elevation view of a portion of the drive illustrated in FIG. 5 with diagrammatic representations of the drum and certain operating positions of the mechanism.

FIG. 6 is a view of the push rod mechanism including a diagrammatic indication of several positions of the push rods. The head 70 has been shown in essentially its uppermost position at the point where it is about to move out of engagement with the drive pin 34, and the head 71 is shown in a position at which it has just engaged one of the drive pins 35 indicated at 35′ because this position corresponds to a position of the drum earlier than that represented by the drive pin 34 in engagement with the head 70. The actual position of the drive pin 35 with respect to the drive pin 34 is indicated at 35 above the position 35′.

Since the head 70 has attained its highest position, its movement will stop and the drum will continue to rotate until a surface 110 of a cam bar 111 engages a cam follower 112 on the head 70, at which time the head 70 is pushed away from the drum against the pressure of the toggle spring 87. Furthermore, on reaching its uppermost position the cam on the crosshead 40 which drives the head 70 reverses the direction of fluid supply to the cylinder 36 so that the movement against the cam 110 is a combination of the forward movement of the drum and the rearward movement of the head 70 and is rapid.

As the head 70 moves downwardly the follower 112 continues over the surface of the cam 110 until the control is actuated to its dwell position represented by the dotted line position of the head 70 indicated at 70′. Here the head waits until the next drive pin 34 moves into position at the end of the cam 111, when the follower 112 leaves the cam and allows the head 70 to move into position against the drive pin. The upward stroke is then started by shifting of the dwell valve and the head again moves upwardly.

The lower position of the head 71 indicated on the drawing wherein it engages the drive pin 35 in the position 35′ is essentially its position at the time that the power for the upper stroke is applied, and at the time the head 70 and drive pin 34 are in the uppermost position shown in the drawing the pin 35 will have moved from the position 35′ to the position indicated above the drive pin 35. Thus the power is applied to the head 71 to move the drum while the head 70 is still in engagement with the drive pin 34 and actively driving the drum. This arrangement whereby each head begins its power stroke before the other has completed its power stroke assures uniform and steady application of power to the drum and provides uniform rotation of the drum and operation of the diffuser.

The pusher bars are operated alternatively, the positions of the drive pins being staggered as indicated in the description of FIG. 1, and the cams 111 for the head 70, and which are positioned in a series about the periphery of the drum with the drive pins 34 located in gaps between the cams, are also staggered with respect to a similar set of cams indicated at 114 in FIG. 1 and which are positioned with respect to the drive pins 35 in the same manner that the cams 111 are positioned with respect to the drive pins 34.

The operation of the two pusher bar assemblies is identical, each bar completing its upward stroke and being released and returned to a dwell position until the next drive pin comes into position for engagement and thereupon engaging the drive pin and applying power to the drum before the opposite pusher bar has completed its power stroke.

The arrangement of the cams and pins is clearly shown in FIGS. 7, 8 and 9. In FIGS. 7 and 8 the heads 70 and 71 have been indicated in dotted line positions wherein both are applying power to the drum, these positions being such that the upper head (the head 71 as shown) is just approaching its top position. The cams 111 which are of the same configuration as the cams 114 but are in staggered relationship thereto, have been omitted from FIG. 7 for the sake of clarity.

The position of the two heads when both are in engagement represents a condition during which the lower head has engaged and is delivering power to the drum before the upper head has reached the end of its stroke. The staggered arrangement of the drive pins 34 and 35 and the cams 111 and 114 which extend over the spaces between their respective sets of drive pins is clearly shown in FIG. 8 and the construction of the ring assembly on which the sets of drive pins 34 and 35 and the rack 50 are mounted is apparent from FIG. 9 wherein the rack and drive pins are shown as assembled on a frame comprising rings 115 and 116 welded to the drum 10 and having a closure ring 117 extending between them and acting as a base for the drive pins and rack.

The position and arrangement of the cam follower 112 for the pusher head 70 are clearly shown in FIG. 8 and the corresponding cam follower 118 of the head 71 for engaging the cams 114 is also illustrated, both of these followers being shown in their positions between the ends of adjacent cams. As soon as either of the pusher bars 38 and 39 reaches the uper end of its stroke the corresponding drive pins 34 and 35 move away from the respective heads 70 or 71 and the cam follower of that head rides out over the corresponding cam while the pusher bar is retracted by the supplying of pressure fluid through the upper conduit 96 or 97 as the case may be.

Figure 10:
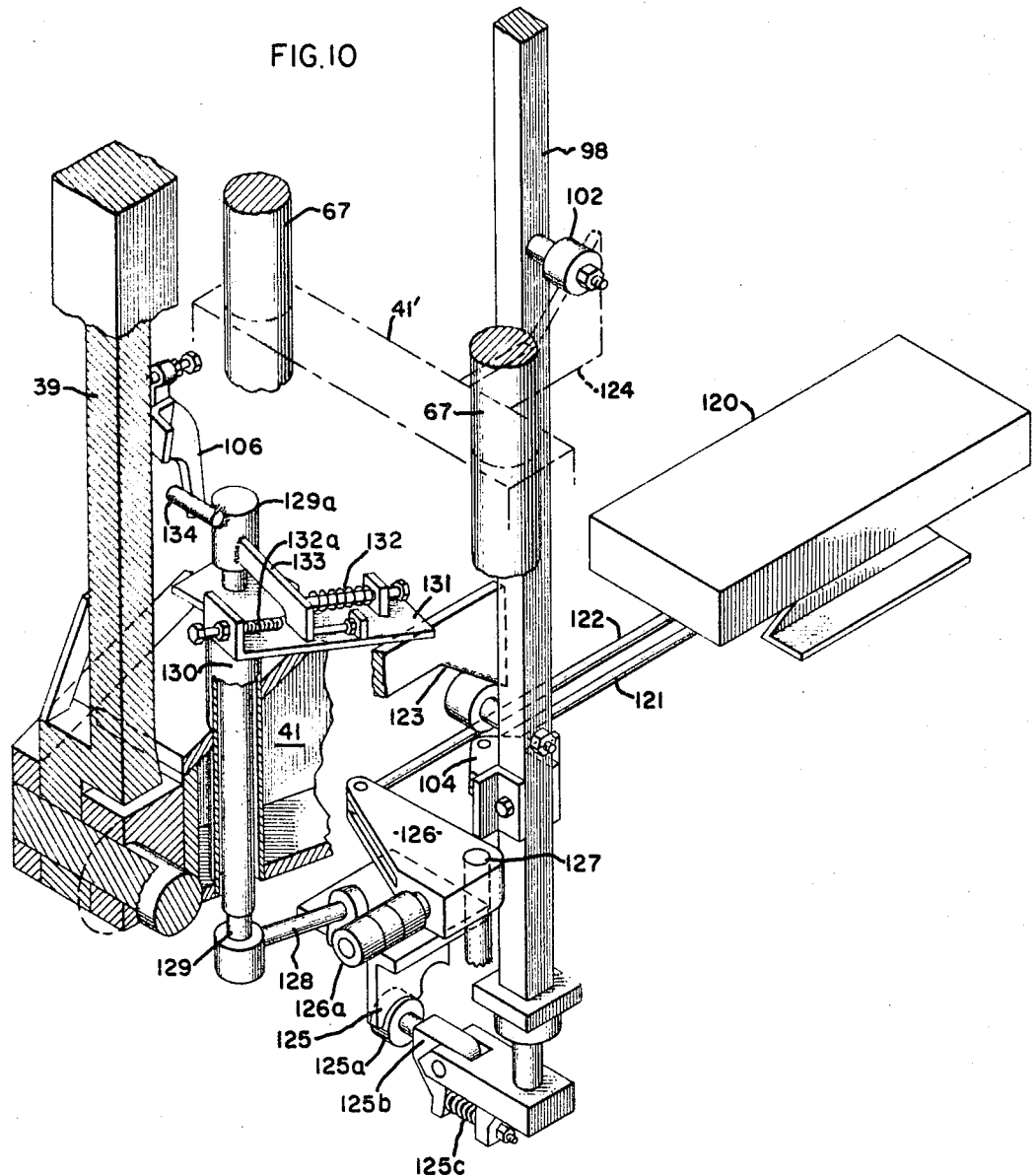
FIG. 10 is an enlarged isometric view partly broken away and partly in section of the control actuating assembly of one of the drive mechanisms.

FIG. 10 illustartes the limit cam arrangement which controls the operation of the forward and return valves and the dwell valves. This figure shows, by way of example, the drive assembly for the pusher bar 39 and has been substantially broken away in order to show more clearly the arrangement of the parts. The control valves (not shown) are supported from a housing or guard 120 and are actuated by push rods 121 and 122, the rod 121 actuating the forward and reverse valve and the rod 122 the dwell valve.

The lower limit cam is indicated at 123 in FIG. 10, it being understood that it is rigidly secured to the crosshead 41. This cam slopes downwardly and rearwardly as viewed in this figure and on engagement with the cam follower 103 moves the cam toward the front and rotates the shaft from left to right. The upper limit cam is indicated at 124, it also being rigidly secured to the crosshead 41 and being positioned to lie on the opposite side of the shaft 98 from the cam 123. When the cam 124 moves upwardly and engages the cam follower 102 it rotates the shaft 98 from right to left as viewed in FIG. 10. Thus the two cam positions determine whether the valve actuating rod 121 is in its innermost position toward the valves or in its outermost position. Under control of the cams 123 and 124 the shaft 98 is thus either in its position to hold the valve stem 121 in or in its position to hold it out. These two positions are determined positively by a two-position cam 125 which is engaged by a spring-pressed roller of cam follower 125a secured to the lower end of the shaft 98. The follower 125a is mounted on a bell crank 125b and is biased toward the cam 125 at all times by a compression spring 125c.

The dwell valve is held in its stem-in position by a bell crank 126 which is biased by a spring (not shown) to press the stem 122 toward the right by clockwise rotation of the bell crank which is mounted on a fixed pivot 127. When the crosshead 41 moves to its lower position as shown in FIG. 10, a roller or cam follower 126a on the bell crank is engaged by a cam on the end of an arm 128 and the bell crank 126 is rotated counterclockwise about the pivot 127 to move the stem 122 to the left and actuate the dwell valve to its stem-out or dwell position.

The arm 128 is rigidly secured to the bottom of a shaft 129 which is rotatably mounted in a bushing or sleeve assembly 130 extending through and rigidly secured to the head 41. The sleeve assembly carries a plate 131 on which is mounted a spring 132 and an adjustable stop 132a against which the spring 132 presses an arm 133 rigidly secured to the head 129a of the shaft 129. The spring 132 thus biases the shaft in a clockwise direction as viewed in FIG. 10 and urges the arm 128 to a position for engagement with the roller arm 126a when the crosshead 41 moves to its bottom position. The spring 132 is sufficiently strong to assure rotation of the bell crank 126 and actuation of the dwell valve upon engagement of the arm 128 with the roller arm 126a.

In the lowermost position of the crosshead 41 the finger 106 lies on the far side of a pin 134 rigidly attached to the head 129a on the side opposite the arm 133. When the head 71 moves toward the drum adjacent the next drive pin 35 the finger 106 engages the pin 134 and rotates the shaft 129 in a counterclockwise direction thereby moving the arm 128 away from the roller 126a and releasing the bell crank 126 to return the dwell valve to its stem-in position. Thereupon the system is connected for normal operation and the application of fluid under pressure to the bottom of the cylinder 37 moves the pusher bar 39 upwardly and the finger 106 is moved away from engagement with the pin 134 as the head 71 of the pusher bar 39 swings farther from the center of the drum.

The hydraulic system and control of the system is illustrated schematically in FIG. 11. It will be understood that any necessary relief valves and other fluid control devices are normally employed and will be used with this system. However, such devices are not essential to an understanding of the invention and have been omitted to simplifying the diagram.

The supply of power fluid for actuating the pistons within the cylinders 36 and 37 is provided by variable volume pumps 140 and 141 which are of a type wherein the direction of flow and the volume are controlled through a mechanical servo valve control unit indicated generally at 142 and 143, respectively. This type of pump and control is well known in the hydraulic power art and the details thereof are not essential to an understanding of the present invention. The mechanical servo valve control units 142 and 143 have slidable stems 144 and 145, respectively, through which the control of the system is effected. These plungers when in their farthest-in position control the up speed of the heads 70 and 71, respectively, and in their out positions the down speed of the heads. An intermediate position is provided which is a neutral position between the two extreme positions which represent the reverse flow positions of the system. The speeds in the up and down positions are determined by the degree of movement of the plungers away from the neutral position in each direction.

The forward or upward movement of the piston rods 62 and 63 is effected by discharging fluid from the respective pumps 140 and 141 through conduits 94 and 95 and the downward movement of the rods by discharging the fluid from the pumps through the conduits 96 and 97. When fluid is discharged through one conduit it thus can be returned to the pump through the other in each case.

The pistons to which the piston rods 62 and 63 are connected are indicated at 146 and 147, respectively, and it will be obvious that the admission of pressure fluid at the respective cylinders below these pistons will produce upward movement and admission of the pressure fluid to the upper portions of the chambers will produce downward movement.

Variable volume pumps such as those represented at 140 and 141 are usually designed so that fluid under pressure is required at the pump port which is taking in oil and therefore a supercharge pump 138 is used to furnish this fluid. The fluid travels from the supercharge pump to the variable volume pumps through conduit 136. Pressure in the conduit 136 is maintained by a supercharge relief valve 137. Excess oil passes through the supercharge relief valve and is returned to fluid reservoir R. Fluid passes from conduit 136 to the proper port of the variable volume pump through one of the check valves of two pairs of check valves indicated at 139a and 139b. While piston 146 or 147 is moving upward, fluid passes through the lefthand check valve of the respective pair 139a or 139b and while piston 146 or 147 is moving downward, fluid may pass through the respective righthand one of the pairs of check valves.

Because the piston rods 62 and 63 occupy a portion of the upper area of hydraulic cylinders 36 and 37, more fluid is displaced beneath piston 146 or 147 than is taken into the cylinder above the piston. This excess is removed by means of the remote operated sequence valves 148 and 149, respectively, from conduits 94 and 95 and passes to the supercharge conduit 136 and ultimately to the reservoir R. The valves 148 and 149 are modulating valves and each begins to open when the pressure in the respective one of conduits 96 and 97 reaches a preset amount.

To achieve uniform and continuous rotation of drum 10, it is necessary that each head 70 and 71 as it begins its upper movement be in contact with one of its respective drive pins 34 and 35 before the other head reaches the top of its travel. Since fluid output from both variable volume pumps is identical, both heads would move upward at the same speed if a speed up circuit were not used. The speed up circuit is a system of piping and valves arranged so that a head, when it is first beginning its upward travel, moves upward at a faster speed than the drum speed until it contacts a drive pin. This speed up circuit is necessary, because during the time required for a head to move inward toward the drum the drive pin is also moving upward and a space is left vertically between the two as the head moves upward. If there were no speed up circuit, the diffuser drum would come to a complete stop as soon as the head nearing the top of its stroke did stop and the drum would remain stationary until the other head actually caught up with a drive pin and began pushing it. The acceleration circuit, therefore, makes possible uniform and continuous rotation of the drum.

The speed up circuit is shown in FIGURE 11 and consists of check valves 150a and 151a, counterbalance valves 150b and 151b, and interconnecting conduits 150 and 151. Operation can be seen from the following example.

Assume head 70 is moving upward and is pushing its drive pin (and the diffuser drum) and is nearing the end of its upward travel. At this same instant, head 71 begins to move upward and it is desired that head 71 move upward at a speed greater than the speed of diffuser drum 10. For acceleration of head 71, fluid flows from the top of cylinder 36 through conduit 150 and check valve 150a and into the bottom of cylinder 37. This fluid plus the fluid entering the bottom of cylinder 37 through conduit 95 (from variable volume pump 141) causes head 71 to move upward at a greater speed than head 70 is moving. As soon as head 71 contacts a drive pin 34, the fluid pressure under piston 147 becomes greater than the fluid pressure above piston 146 and check valve 150a automatically closes, ending the flow of acceleration fluid. Thereafter heads 70 and 71 move upward at the same rate. When head 70 stops and begins to move downward, head 71 continues to move upward and drives the diffuser drum. Counterbalance valve 150b imposes a continuous restriction on fluid leaving the top of cylinder 36 and by this restriction maintains a minimum preset pressure in the top of cylinder 36 at all times—thereby causing fluid to flow through the acceleration conduit 150 when this fluid is required for acceleration. Valve 150b is a modulating valve which endeavors to maintain this preset pressure at all times regardless of flow. Reverse flow through the counterbalance valve is free flow due to a built in reverse flow check valve (not shown).

This sequence of events occurs each time either of the heads 70 or 71 begins its upward travel.

It should also be noted that during the time a piston is in the dwell position there is a down bias of fluid to hold the piston 146 or 147 at the bottom of the cylinder. Since there is, for this short period of time, a small flow of fluid from variable volume pump 140 or 141 but no corresponding movement of piston 146 or 147, it is necessary to remove fluid from conduit 96 or 97 to prevent excessive pressure build up in these conduits. This is accomplished by means of relief valves 158 and 159 which allows fluid to escape from conduits 96 or 97 into the supercharge conduit 136 and thence to reservoir R.

The system for determining the direction and speed of the hydraulic fluid under the various conditions of operation is controlled by the cam operated valves described above and which are schematically illustrated in FIG. 11. The directional valve for controlling the pump 140 and thereby the piston rod 62 is indicated at 152 and that for the pump 141 and cylinder 37 at 153. The associated dwell valve controls are indicated at 154 and 155, respectively. These direction and dwell valves are actuated by the cam controlled stems such as the stems 121 and 122 illustrated in FIG. 10 and thus the positions of these valves and their control of the mechanical servo valve control units 142 and 143 are dependent upon the positions of the pusher bar mechanism as determined by the cams actuated thereby.

The valves 152, 153, 154 and 155 are arranged in the circuit of control cylinders 156 and 157 for the control units 142 and 143, respectively. Fluid for actuating the cylinders is supplied from control pumps 160 and 161. Thus with the controls in the positions illustrated, both pistons indicated at 162 and 163, respectively, will be moved downwardly when fluid is supplied from the pumps, and when the valves 152 and 153 are moved to their opposite positions, fluid will enter the lower chamber of the cylinders 156 and 157 and the controls will move upwardly. The valves 152 and 153 as illustrated include straight-through passages in the positions shown and when shifted to their opposite positions connect the pump by cross passages as indicated. The flow of fluid to the cylinders 156 and 157 is effected only after the valves 154 and 155 have moved from their dwell positions illustrated to their opposite straight-through positions in which they allow free flow of fluid to and from the cylinders.

The dwell control valves 154 and 155 in their dwell or "stem-out" positions as illustrated connect the conduits at the cylinders 156 and 157 together so that the pressures on the two sides thereof are equalized. When the pressures are equalized in this manner the pistons assume a central position in the cylinders as shown due to the operation of compression springs 164 and 165 within the speed control assemblies 166 and 167, respectively.

The assemblies 166 and 167 include slide members 168 and 169 which are secured to the rods of pistons 162 and 163, respectively, and move with the pistons. The slides are provided with slidable upper plates 170 and 171, respectively, and similar slidable lower plates 172 and 173, respectively. These plates are slidable on the members 168 and 169 and are biased or urged apart by the springs 164 and 165. When the pistons 162 and 163 are urged downwardly from the positions shown in the figures, the upper plates 170 and 171 are engaged by inner top portions 174 and 175, respectively, on the slides 168 and 169. Upon this downward movement the slide members 170 and 171 strike adjustable stops 176 and 177, respectively. The positions of these adjustable stops determine the down positions of the control and therefore the up speed of the pumps and hence of the pusher bars 38 and 39. The down speed is similarly determined by inner bottom portions 180 and 181 of the slides 168 and 169 which engage the plates 172 and 173 on upward movement of the slides to bring these plates against adjustable stops 182 and 183. Thus the position of these adjustable stops determines the down speed of the pusher bars 38 and 39.

In this neutral or dwell position slight flow of fluid through the pumps may be provided for biasing the pusher bars 38 and 39 to their down positions during dwell.

While the controls have been illustrated and described above as both in the dwell positions, it will be understood that during the operation of the system the two controls effect alternate upward driving movement of the pusher bars followed by downward movement and dwell in each case. In the event that both pistons are in their dwell positions and it is desired to start the system, this may be accomplished by releasing one of the dwell control cams as represented by the assembly 105 in FIG. 5. As soon as the dwell valve has been released to move to its "stem-in" position the corresponding control will discharge fluid from the main pump to the corresponding cylinder and the forward movement of the respective pusher bar will be initiated. Thereafter the operation of the system is automatic under control of the cams.

Damage to the push rods 144 and 145 of the pump controls is prevented by an override assembly at the bottom of each of the sliders 168 and 169 as indicated at 186 and 187, respectively. These devices include spring pressed plungers which, in the event of excess pressure against the actuators 144 and 145 will allow the stops 180 and 181 to move upwardly and thereby prevent damage.

During the operation of the system the control of the two pumps 140 and 141 is thus effected by individual control systems actuated by cams on the moving parts of the drive. The coordination of the movement of the pusher bars into and out of position against the pins 34 and 35 and the arrangement whereby the pusher bars are operated alternately but wherein each starts its pressure stroke before the end of the pressure stroke of the other assure smooth and effective operation and movement of the massive drum and its contents under treatment. The system has been found very effective in maintaining operation of an eccentrically loaded massive drum employed, for example, as a beet sugar diffuser. The system may be employed to drive both horizontal and vertical axis diffuser drums and other equipment; it is particularly useful for drives required to operate at the higher speeds in both horizontal and vertical axis rotating drum installations.

While the invention has been illustrated and described in connection with a specific rotating drum-type apparatus, various other applications and modifications will occur to those skilled in the art. Therefore, it is not desired that the invention be limited to the specific details illustrated and described and it is intended by the appended claims to cover all modifications which fall within the spirit and scope of the invention.

We claim:

1. In a drive system for rotating drum type material treating equipment of the type having continuous eccentric loading tending to reverse the direction of rotation comprising means providing a multiplicity of drive lugs secured to and evenly spaced circumferentially of the drum to be driven, a plurality of pusher bars each having a drive portion positioned to engage respective ones of said lugs in predetermined positions and mounted for driving the drum in the same direction, hydraulic power means for driving said bars in forward and return strokes to rotate the drum, and means for holding the drive portion of each of said bars and a respective one of said lugs in driving engagement during the forward stroke of the bar and for moving the respective drive portion of the bar away from the drum and holding it out of its driving engagement position with said lugs during the return stroke thereof, the improvement which comprises means for retaining each bar in its starting position until a lug is in position for driving engagement, hydraulic liquid supply means for said power means of each of said bars, and control means for actuating said supply means for initiating and completing the power strokes of said bars in continuous successive order and for returning each bar to its starting position at the end of its power stroke, said control means including means for moving each bar forward from its starting position into engagement with one of said lugs and for starting the power stroke of each bar after engagement with said one lug and before the completion of the power stroke of another of said bars whereby driving power is applied to said drum continuously and smooth continuous rotation of the drum is effected.

2. A driving system for rotating drum type material treating equipment comprising means providing a multiplicity of drive lugs secured to and evenly spaced circumferentially of the drum to be driven, a plurality of pusher bars each having a drive portion positioned to engage respective ones of said lugs in predetermined positions and mounted for driving the drum in the same direction, power means for driving said bars in forward and return strokes to rotate the drum, means for holding the drive portion of each of said bars and a respective one of said lugs in driving engagement during the forward stroke of the bar and for moving the respective drive portion of the bar away from the drum and holding it out of its driving engagement position with said lugs during the return stroke thereof, means for retaining each bar in its starting position until a lug is in position for driving engagement, control means for effecting the power strokes of said bars in continuous successive order and for returning each bar to its starting position at the end of its power stroke, said control means including means for starting the power stroke of each bar before the completion of the power stroke of another of said bars whereby smooth continuous rotation of the drum is effected, and means for maintaining each bar in a dwell position for a significant interval of time extending from the end of its return stroke and the start of its power stroke.

3. A driven system for rotating drum type material treating equipment comprising means providing a multiplicity of drive lugs secured to and evenly spaced circumferentially of the drum to be driven, a plurality of pusher bars each having a drive portion positioned to engage respective ones of said lugs in predetermined positions and mounted for driving the drum in the same direction, power means for driving said bars in forward and return strokes to rotate the drum, means for holding the drive portion of each of said bars and a respective one of said lugs in driving engagement during the forward stroke of the bar and for moving the respective drive portion of the bar away from the drum and holding it out of its driving engagement position with said lugs during the return stroke thereof, means for retaining each bar in its starting position until a lug is in position for driving engagement, and control means for effecting the power strokes of said bars in continuous successive order and for returning each bar to its starting position at the end of its power stroke, said control means including means for starting the power stroke of each bar before the completion of the power stroke of another of said bars whereby smooth continuous rotation of the drum is effected, said lugs being arranged in two circumferential sets and all said lugs being spaced equally and the lugs on said two sets being positioned in staggered relationship to one another.

4. A drive system for rotating drum type equipment as set forth in claim 3 including control means associated with each of said pusher bars for initiating the power stroke thereof upon engagement with a lug of its respective set.

5. A drive system for rotating drum type material treating equipment comprising means providing a multiplicity of drive lugs secured to and evenly spaced circumferentially of the drum to be driven, a plurality of pusher bars each having a drive portion positioned to engage respective ones of said lugs in predetermined positions and mounted for driving the drum in the same direction, power means for driving said bars in forward and return strokes to rotate the drum, means for holding the drive portion of each of said bars and a respective one of said lugs in driving engagement during the forward stroke of the bar and for moving the respective drive portion of the bar away from the drum and holding it out of its driving engagement position with said lugs during the return stroke thereof, means for retaining each bar in its starting position until a lug is in position for driving engagement, and control means for effecting the power strokes of said bars in continuous successive order and for returning each bar to its starting position at the end of its power stroke, said control means including means for starting the power stroke of each bar before the completion of the power stroke of another of said bars whereby smooth continuous rotation of the drum is effected, said bars being pivotally mounted for swinging movement toward and away from the drum and said means for moving the bars away from the drum comprising a cam mounted on the drum adjacent the lugs and shaped to move the bar quickly away from the drum at the beginning of the return stroke and to return it gradually toward its position for engagement with the next lug, said means for retaining each bar in its starting position comprising a control element dependent upon the swinging of the respective bar toward the drum for preventing forward movement of the driving means, said last mentioned means being released by the camming action of the cam associated with the next lug for initiating the forward driving movement whereupon the bar engages the said next lug under control of said means for effecting the power stroke of said bars and starts its forward stroke.

6. A drive system for rotating drum type equipment as set forth in claim 1 including a set of circumferentially arranged equally spaced ratchet teeth on said drum and means including a plurality of pawls spaced at equal distances different from a whole number multiple of the distance between said teeth by a fraction of the spacing between adjacent teeth and mounted in fixed positions adjacent said drum for preventing reverse rotation of said drum whereby a single one of said pawls will engage a ratchet tooth and stop rotation of said drum on a reverse movement of less than the spacing between said teeth.

7. A drive system for rotating drum type equipment as set forth in claim 1 wherein said hydrualic power means comprises two pistons one connected to each respective bar for driving said bars and said supply means comprises two liquid pumps one for each piston, and wherein said control means comprises actuating means dependent upon the movement of said bars into their respective extreme forward and return positions for reversing the direction of flow of liquid to the respective pistons and for varying the rate of such flow.

8. A drive system for rotating drum type material treating equipment comprising means providing a multiplicity of drive lugs secured to and evenly spaced circumferentially of the drum to be driven, a plurality of pusher bars each having a drive portion positioned to engage respective one of said lugs in predetermined positions and mounted for driving the drum in the same direction, power means for driving said bars in forward and return strokes to rotate the drum, means for holding the drive portion of each of said bars and a respective one of said lugs in driving engagement during the forward stroke of the bar and for moving the respective drive portion of the bar away from the drum and holding it out of its driving engagement position with said lugs during the return stroke thereof, means for retaining each bar in its starting position until a lug is in position for driving engagement, control means for effecting the power strokes of said bars in continuous successive order and for returning each bar to its starting position at the end of its power stroke, said control means including means for starting the power stroke of each bar before the completion of the power stroke of another of said bars whereby smooth continuous rotation of the drum is effected, said power means comprising a hydraulic system having two pistons one connected to each respective bar for driving said bars and two liquid pumps one for each piston, said control means comprising actuating means dependent upon the movement of said bars into their respective extreme forward and return positions for reversing the direction of flow of liquid to the respective pistons and for varying the rate of such flow, said bars being mounted for swinging movement toward and away from the drum, and said means for retaining said bars in their starting positions comprising a dwell control means responsive to pivotal movement of each respective bar toward said drum at the end of its return stroke for minimizing the flow of liquid from its respective pump to hold its piston in a dwell position and afford engagement of the bar with the next lug before the subsequent forward stroke, and means on the drum adjacent said next lug for pivoting the bar toward the drum on further movement of the drum sufficiently to release said dwell control means and initiate the forward stroke of the respective bar.

9. A drive system for rotating drum type material treating equipment comprising means providing a multiplicity of drive lugs secured to and evenly spaced circumferentially of the drum to be dirven, a plurality of pusher bars each having a drive portion position to engage respective ones of said lugs in predetermined positions and mounted for driving the drum in the same direction, power means for driving said bars in forward and return strokes to rotate the drum, means for holding the drive portion of each of said bars and a respective one of said lugs in driving engagement during the forward stroke of the bar and for moving the respective drive portion of the bar away from the drum and holding it out of its driving engagement position with said lugs during the return stroke thereof, means for retaining each bar in its starting position until a lug is in position for driving engagement, control means for effecting the power strokes of said bars in continuous successive order and for returning each bar to its starting position at the end of its power stroke, said control means including means for starting the power stroke of each bar before the completion of the power stroke of another of said bars whereby smooth continuous rotation of the drum is effected, said power means comprising a hydraulic drive including a plurality of cylinders having double-acting pistons connected in driving relationship to respective ones of said pusher bars and a corresponding plurality of pumps of the reversible flow variable volume type connected to supply respective ones of said cylinders for forward and reverse movements of the pistons therein, each of said pumps having a three-position speed control for providing predetermined forward and reverse pump flow speeds and an intermediate neutral flow position, and said control means including means dependent upon the position of said bars for moving said three-speed control to its forward position when its respective bar reaches the end of its return stroke and to its reverse position when its respective bar reaches the end of its forward stroke, said retaining means being connected to hold said three-speed control in its intermediate position for a significant time interval before the start of the forward movement of the respective pistons.

10. A drive system for rotating drum type equipment as set forth in claim 9 wherein said control means includes an actuating element movable between forward and reverse stop positions for moving said three speed control to its respective forward and reverse positions and wherein said retaining means comprises means for biasing said element to a position intermediate its forward and reverse stop positions for holding said three speed control in its neutral flow position.

11. A drive system for rotating drum type material treating equipment and the like comprising means providing a multiplicity of evenly spaced drive engaging elements arranged circumferentially of the drum to be driven, a plurality of pusher bars each having a drive portion positioned to engage respective ones of said elements in predetermined positions thereof and mounted for driving the drum in the same direction, means including a plurality of hydraulic cylinders each having a piston therein for driving respective ones of said bars in forward and return strokes to rotate the drum, means for holding each of said bars and a respective one of said elements in engagement during the forward stroke of the bar and for moving the bar away from the drum and holding it out of its driving engagement position with said elements during the return stroke thereof, means including a plurality of liquid pumps for supplying liquid to respective ones of said cylinders to drive said pistons at predetermined speeds, valve means for connecting each of said cylinders to its respective pump to drive the piston therein forward when liquid is supplied to one side thereof and to return the piston when liquid is supplied to the other side thereof, means for controlling said liquid supply means for effecting the forward stroke of said bars in continuous successive order and for returning each bar to its starting position at the end of its forward stroke, said control means including means for initiating the forward stroke of each of said pistons before the termination of the forward stroke of another of said pistons and prior to the driving engagement of its respective bar with a respective one of said elements, and means for supplying additional fluid to each of said cylinders during the forward stroke of the piston therein for accelerating the movement of the piston prior to the driving engagement of its bar with the respective element whereby the piston overtakes the respective element for driving engagement therewith and initiation of its forward power stroke during the forward power stroke of the other of said pistons.

12. A drive system for rotating drum type equipment as set forth in claim 11 wherein said accelerating means comprises cross connecting conduits between the return side of each cylinder and the forward side of another for transferring liquid from one cylinder to the other upon the forward stroke of the piston in said one cylinder.

13. A drive system for rotating drum type equipment as set forth in claim 12 including means in each of said cross connecting conduits for preventing the passage of fluid from the forward end of each cylinder to the return end of the other.

References Cited
UNITED STATES PATENTS

| | | | |
|---|---|---|---|
| 447,648 | 3/1891 | Sutherland | 74—129 |
| 2,627,755 | 2/1953 | Hooker | 74—129 |
| 2,868,026 | 1/1959 | Finehout et al. | 74—128 |
| 2,947,187 | 8/1960 | Graff et al. | 74—129 |
| 3,101,013 | 8/1963 | Ayers et al. | 74—128 |
| 3,300,697 | 1/1967 | Woodford | 74—128 |

FRED C. MATTERN, JR., Primary Examiner

W. S. RATLIFF, JR., Assistant Examiner